(12) United States Patent
Sung et al.

(10) Patent No.: US 11,851,018 B2
(45) Date of Patent: Dec. 26, 2023

(54) SEAT AIRBAG DEVICE FOR VEHICLE AND METHOD OF CONTROLLING OPERATION THEREOF

(71) Applicants: Hyundai Motor Company, Seoul (KR); Kia Corporation, Seoul (KR); HYUNDAI MOBIS CO., LTD., Seoul (KR)

(72) Inventors: Il Chang Sung, Hwaseong-si (KR); Sang Won Hwangbo, Yongin-si (KR)

(73) Assignees: HYUNDAI MOTOR COMPANY, Seoul (KR); KIA CORPORATION, Seoul (KR); HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 17/840,012

(22) Filed: Jun. 14, 2022

(65) Prior Publication Data

US 2023/0077128 A1 Mar. 9, 2023

(30) Foreign Application Priority Data

Sep. 6, 2021 (KR) .................. 10-2021-0118346

(51) Int. Cl.
*B60R 21/207* (2006.01)
*B60R 21/231* (2011.01)
(Continued)

(52) U.S. Cl.
CPC .......... *B60R 21/207* (2013.01); *B60R 21/233* (2013.01); *B60R 21/239* (2013.01);
(Continued)

(58) Field of Classification Search
CPC ............ B60R 21/207; B60R 21/23138; B60R 21/233; B60R 21/2338; B60R 21/239; B60R 2021/0004; B60R 2021/0006; B60R 2021/0009; B60R 2021/0044; B60R 2021/0048; B60R 2021/0055; B60R 2021/23146; B60R 2021/23308; B60R 2021/23386; B60R 2021/23316; B60R 2021/23324; B60R 2021/23332
See application file for complete search history.

(56) References Cited

U.S. PATENT DOCUMENTS

2017/0291569 A1* 10/2017 Sugie .................. B60R 21/233
2019/0299902 A1* 10/2019 Nagasawa .............. B60N 2/002
(Continued)

FOREIGN PATENT DOCUMENTS

KR 10-2019-0020254 A 2/2019
KR 10-2021-0158720 A 12/2021

*Primary Examiner* — Jason D Shanske
*Assistant Examiner* — Matthew James O'Neill
(74) *Attorney, Agent, or Firm* — Morgan, Lewis & Bockius LLP (57) ABSTRACT

A seat airbag apparatus for a vehicle and a method of controlling the operation thereof, includes side cushions deployed from the seatback, front cushions configured to be deployed from the side cushions, and inflators for the side cushions and inflators for the front cushions. The deployment operation of the side cushions and the deployment operation of the front cushions are respectively controlled depending on a normal seating mode and a relax mode of an occupant and a side collision and a front collision of the vehicle.

20 Claims, 9 Drawing Sheets

(51) Int. Cl.
*B60R 21/233* (2006.01)
*B60R 21/2338* (2011.01)
*B60R 21/239* (2006.01)
*B60R 21/00* (2006.01)

(52) U.S. Cl.
CPC .... *B60R 21/2338* (2013.01); *B60R 21/23138* (2013.01); *B60R 2021/0004* (2013.01); *B60R 2021/0006* (2013.01); *B60R 2021/0009* (2013.01); *B60R 2021/0044* (2013.01); *B60R 2021/0048* (2013.01); *B60R 2021/0055* (2013.01); *B60R 2021/23146* (2013.01); *B60R 2021/23308* (2013.01); *B60R 2021/23386* (2013.01)

(56) References Cited

U.S. PATENT DOCUMENTS

| | | | |
|---|---|---|---|
| 2020/0262383 A1* | 8/2020 | Rahman | B60R 21/261 |
| 2020/0307488 A1* | 10/2020 | Kondrad | B60N 2/64 |
| 2021/0179009 A1* | 6/2021 | Lee | B60R 21/233 |

\* cited by examiner

SEAT AIRBAG DEVICE FOR VEHICLE AND METHOD OF CONTROLLING OPERATION THEREOF

CROSS REFERENCE TO RELATED APPLICATION

The present application claims priority to Korean Patent Application No. 10-2021-0118346, filed Sep. 6, 2021, the entire contents of which is incorporated herein for all purposes by this reference.

BACKGROUND OF THE PRESENT DISCLOSURE

Field of the Present Disclosure

The present disclosure generally relates to a seat airbag device for a vehicle, and more particularly, to a seat airbag device for a vehicle and a method of controlling the operation thereof, wherein the device includes a side cushion configured to be deployed from a seatback, a front cushion configured to extend from the side cushion, an inflator for the side cushion, and an inflator for the front cushion provided separately from the inflator for the side cushion.

Description of Related Art

An autonomous vehicle is a smart vehicle with self-driving technology and able to drive itself to a destination even though a driver does not manipulate the steering wheel, the accelerator pedal, the brake pedal, etc. Recently, the development of autonomous vehicles is progressing rapidly.

When an autonomous driving situation is universalized, a driver may select a relax mode to take a rest instead of driving a vehicle by him/herself while driving of the vehicle. In the relax mode situation, the movement, pivoting, position, etc. of a seat may be variously changed as demanded by an occupant.

In the present manner, when the seating condition of the occupant is variously changed in the autonomous driving situation, it is impossible to effectively restrain the movement of the occupant in an accident only using a conventional airbag device provided in the vehicle.

Thus, there is a demand for an airbag device based on a new concept suitable to autonomous vehicles. For example, there has been developed a seat airbag device able to further improve an occupant protection effect by effectively restraining the movement of an occupant in the lateral, forward, and diagonal directions using side cushions configured to be deployed forward from the seatback and front cushions configured to be deployed from the side cushions to protrude in front of the occupant.

However, the seat airbag device of the related art is configured to deploy the side cushions and the front cushions using a single inflator. The side cushions are deployed first by airbag gas generated by the inflator and then the front cushions are deployed. Thus, the deployment time of the front cushions is delayed, which is problematic.

Furthermore, because the airbag gas rapidly moves to the front cushion through the side cushion, it is difficult to maintain the internal pressure of the side cushion. Consequently, side collision performance may be reduced, which is problematic.

The information included in this Background of the present disclosure section is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a seat airbag apparatus for a vehicle and a method of controlling the operation thereof, wherein the device includes a side cushion configured to be deployed forward from a seatback, a front cushion configured to be deployed from the side cushion to protrude in front of an occupant, an inflator for the side cushion, and an inflator for the front cushion provided separately from the inflator for the side cushion. It is thus possible to overcome the drawback in that the deployment time of the front cushion is delayed and improve side collision performance by maintaining a sufficient amount of internal pressure of the side cushion. Consequently, protection performance for an occupant may be further improved.

It is also intended to respectively control the deployment operation of the side cushion and the deployment operation of the front cushion depending on the normal seating mode and the relax mode of the occupant and the side collision and the front collision of the vehicle, more effectively protecting the occupant.

In various aspects of the present disclosure, there is provided a seat airbag apparatus for a vehicle. The seat airbag apparatus may include: a side cushion configured to be deployed from a seatback of the vehicle to protrude forward and be located at a side of an occupant; a front cushion configured to be deployed from the side cushion to protrude in front of the occupant; a first inflator fixed to the seatback and configured to generate airbag gas to deploy the side cushion when the first inflator is operated; and a second inflator fixed to the seatback and configured to generate airbag gas to deploy the front cushion when the second inflator is operated.

The seat airbag apparatus may further include a controller configured for controlling the operation of the first inflator and the second inflator by receiving signals from a collision detector, an occupant detection detector, and a seatback angle detector.

Regions of protection of the occupant protected by the side cushion may include a chest portion, an abdomen portion, and a pelvis portion of the occupant.

The side cushion and the front cushion may be configured so that deployment areas of the side cushion and the front cushion are separated from each other. The first inflator may be disposed to be included in the deployment area of the side cushion. The second inflator may be disposed to be included in the deployment area of the front cushion.

The side cushion may have a vent hole provided in a predetermined position of a front portion. An internal space of the side cushion and an internal space of the front cushion may be connected through the vent hole.

The deployment area of the front cushion may include a front cushion path portion configured to be deployed above the side cushion. The second inflator may be disposed to be positioned within the front cushion path portion.

The front cushion path portion may be provided integrally with the front cushion so that an internal space of the front cushion path portion is fluidically connected to the internal space of the front cushion.

The front cushion may be fabricated separately and sewn to the front cushion path portion so that an internal space of the front cushion path portion is fluidically connected to the internal space of the front cushion.

The front cushion path portion may be configured to protect a head portion of the occupant including the neck when deployed.

According to an exemplary embodiment of the present disclosure, there is provided a method of controlling operation of a seat airbag apparatus for a vehicle. The method may include: when an occupant is in a vehicle in a collision of the vehicle, determining a collision type of determining whether or not the collision is a side collision; and when the controller concludes that the collision is the side collision, determining, by a controller, a seatback position of determining whether or not an angle of a seatback corresponds to a normal seating mode. Depending on whether the angle of the seatback corresponds to the normal seating mode or a relax mode in the determining of the seatback position, the controller may selectively control a first inflator and a second inflator to operate to generate airbag gas, and a side cushion and a front cushion may be deployed by the generated airbag gas.

When the angle of the seatback is determined to correspond to the normal seating mode in the determining of the seatback position, the controller may only control the first inflator to operate, the side cushion may be deployed by the airbag gas generated by the operation of the first inflator, and the front cushion may be deployed by receiving the airbag gas from the side cushion.

When the angle of the seatback is determined to correspond to the relax mode in the determining of the seatback position, the controller may be configured to control both the first inflator and the second inflator to operate, and the side cushion and the front cushion may be deployed together by receiving the airbag gas generated by the first inflator and the second inflator.

When the side cushion and the front cushion are deployed together in the relax mode, a portion of the front cushion may be deployed to protect a head portion of the occupant.

When the side cushion and the front cushion are deployed together in the relax mode, the airbag gas generated by the first inflator may be transferred to the front cushion through the vent hole of the side cushion to speed up a deployment time of the front cushion.

When the collision is determined to be a front collision in the determination of the collision type, the controller may be configured to control both the first inflator and the second inflator to operate irrespective of the angle of the seatback, and the side cushion and the front cushion may be deployed together by receiving the airbag gas generated by the first inflator and the second inflator.

When both the first inflator and the second inflator operate in the front collision, the first inflator and the second inflator may simultaneously operate or sequentially operate with a predetermined time difference.

In the seat airbag apparatus for a vehicle and a method of controlling the operation thereof according to an exemplary embodiment of the present disclosure, the side cushions are configured to be deployed from the seatback to cover side portions of the occupant, the front cushions are configured to be deployed from the side cushions to cover the front portion of the occupant, and the inflators for the side cushions and the inflators for the front cushions are provided separately. The side cushions are deployed using the first inflators, and the front cushions are deployed using the second inflators. It is thus possible to overcome the drawback in that the deployment time of the front cushions is delayed and improve side collision performance by maintaining sufficient amounts of internal pressure of the side cushions. Consequently, protection performance for an occupant may be further improved.

Furthermore, the present disclosure is configured to respectively control the deployment operation of the side cushions and the deployment operation of the front cushions depending on the normal seating mode and the relax mode of the occupant and the side collision and the front collision of the vehicle. Consequently, the occupant may be more effectively protected.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Specific structural and functional descriptions of embodiments of the present disclosure disclosed herein are only for illustrative purposes of the embodiments of the present disclosure. The present disclosure may be embodied in many different forms without departing from the spirit and significant characteristics of the present disclosure. Therefore, the embodiments of the present disclosure are disclosed only for illustrative purposes and should not be construed as limiting the present disclosure.

Reference will now be made in detail to various embodiments of the present disclosure, specific examples of which are illustrated in the accompanying drawings and described below, since the embodiments of the present disclosure can be variously modified in many different forms. While the present disclosure will be described in conjunction with exemplary embodiments thereof, it is to be understood that the present description is not intended to limit the present disclosure to those exemplary embodiments of the present disclosure. On the other hand, the present disclosure is directed to cover not only the exemplary embodiments of the present disclosure, but also various alternatives, modifications, equivalents, and other embodiments which may be included within the spirit and scope of the present disclosure.

It will be understood that, although the terms "first", "second", etc., may be used herein to describe various elements, these elements should not be limited by these terms. These terms are only used to distinguish one element from another element. For instance, a first element discussed below could be termed a second element without departing from the teachings of the present disclosure. Similarly, the second element could also be termed the first element.

It will be understood that when an element is referred to as being "coupled", "connected", or "linked" to another element, it may be directly coupled or connected to the other element or intervening elements may be present therebetween. In contrast, it should be understood that when an element is referred to as being "directly coupled", "directly connected", or "directly connected" to another element, there are no intervening elements present. Other expressions that explain the relationship between elements, such as "between", "directly between", "adjacent to", or "directly adjacent to" should be construed in the same way.

The terminology used herein is for describing various exemplary embodiments only and is not intended to be limiting. As used herein, the singular forms "a", "an", and "the" are intended to include the plural forms as well, unless the context clearly indicates otherwise. It will be further understood that the terms "comprise", "include", "have", etc., when used in the exemplary embodiment, specify the presence of stated features, integers, steps, operations, elements, components, and/or combinations thereof but do not preclude the presence or addition of one or more other features, integers, steps, operations, elements, components, and/or combinations thereof.

Unless otherwise defined, all terms including technical and scientific terms used herein have the same meaning as commonly understood by one of ordinary skill in the art to which the present disclosure belongs. It will be further understood that terms, such as those defined in commonly used dictionaries, should be interpreted as including a meaning which is consistent with their meaning in the context of the relevant art and the present disclosure, and will not be interpreted in an idealized or overly formal sense unless expressly so defined herein.

A controller (or a control unit) according to exemplary embodiments of the present disclosure may be realized using a non-volatile memory and a processor. The non-volatile memory stores an algorithm configured to control the operations of a variety of components of a vehicle or data regarding software instructions reproducing the algorithm. The processor is configured to perform following operations using the data stored in the memory. Here, each of the memory and the processor may be implemented as a chip. Alternatively, the memory and the processor may be realized as an integrated single chip. The processor may be one or more processors.

Hereinafter, a seat airbag device for a vehicle and a method of controlling the operation thereof according to exemplary embodiments of the present disclosure will be described with reference to FIG. 1, FIG. 2, FIG. 3, FIG. 4, FIG. 5, FIG. 6, FIG. 7, FIG. 8 and FIG. 9 of the accompanying drawings.

Figure 1:
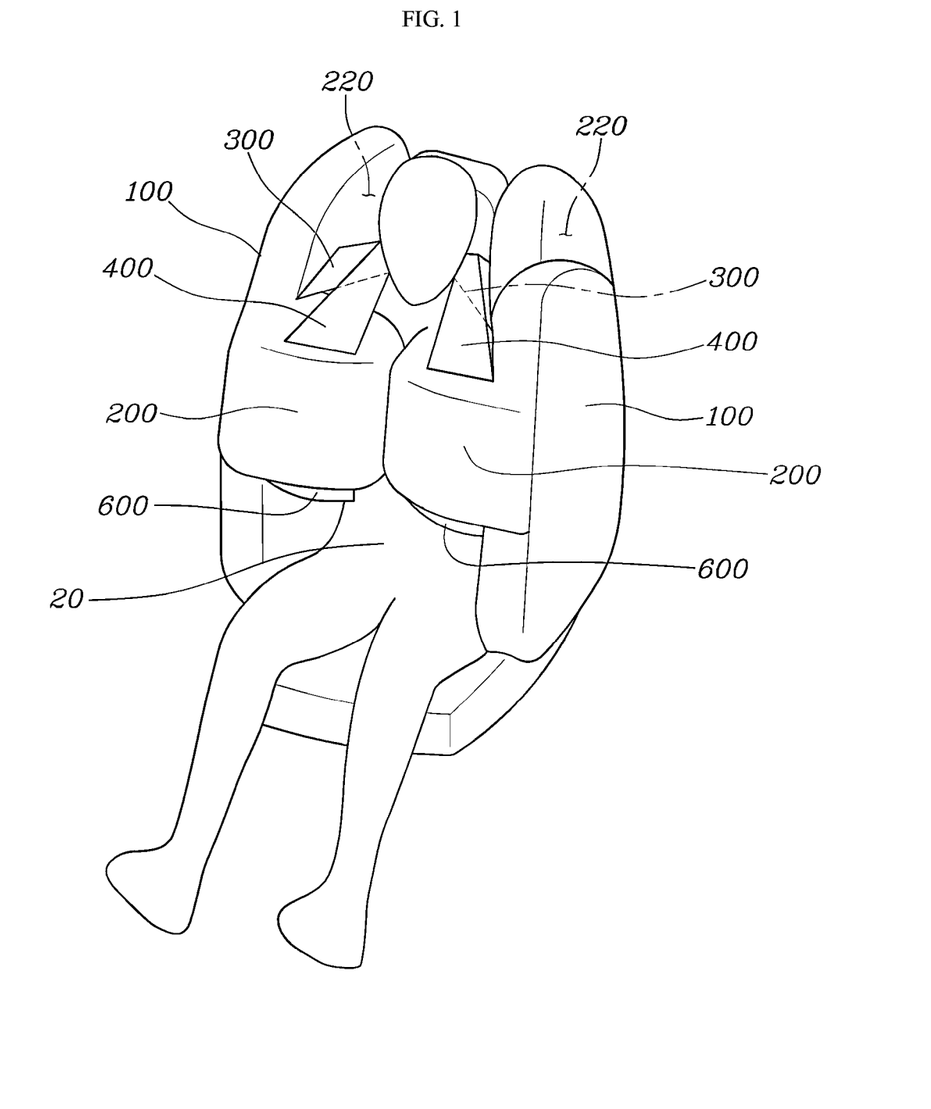
FIG. 1 is a perspective diagram illustrating a situation in which a seat airbag apparatus for a vehicle according to an exemplary embodiment of the present disclosure is deployed.

The seat airbag device for a vehicle according to various exemplary embodiments of the present disclosure may include side cushions 100 configured to be deployed from a seatback 10 of a seat of a vehicle to protrude forward and cover and protect the side portions of an occupant 20 seated on the seat after being deployed; and front cushions 200 configured to be deployed from the side cushion 100 to protrude in front of the occupant 20 and cover and protect the front portion of the occupant 20 after being deployed.

The side cushions 100 are symmetrically provided in the lateral direction with respect to the seatback 10, and the front cushions 200 are symmetrically provided in the lateral direction with respect to the seatback 10.

Furthermore, the seat airbag device according to an exemplary embodiment of the present disclosure further includes: upper side plane tethers 300 coupled to connect the upper end portion of the seatback 10 and the side cushions 100 and configured to be spread into a planar shape having a predetermined size to restrain the deployment of the side cushions 100 when the side cushions 100 are deployed; upper front plane tethers 400 coupled to connect the upper end portion of the seatback 10 and the front cushions 200 and configured to be spread into a planar shape having a predetermined size to restrain the deployment of the front cushions 200 when the front cushions 200 are deployed; lower side plane tethers coupled to connect the lower end portion of the seatback 10 and the side cushions 100 and configured to be spread into a planar shape having a predetermined size to restrain the deployment of the side cushions 100 when the side cushions 100 are deployed; and lower front plane tethers 600 coupled to connect the upper end portion of the seatback 10 and the front cushions 200 and configured to be spread into a planar shape having a predetermined size to restrain the deployment of the front cushions 200 to prevent the front cushions 200 from being moved upwards when the front cushions 200 are deployed.

The upper side plane tethers 300, the upper front plane tethers 400, the lower side plane tethers, and the lower front plane tethers 600 are symmetrically provided in the lateral direction with respect to the seatback 10.

The seat airbag device according to an exemplary embodiment of the present disclosure is configured to be deployed so that the side cushions 100 protrude from the seatback 10, and that, after the side cushions 100 are deployed, the front cushions 200 are subsequently deployed and spread from the side cushions 100. Advantageously, the seat may be moved and pivoted, and the seat airbag device may be used in a variety of autonomous vehicles having a variety of occupant seating conditions.

Furthermore, embodiments according to the present disclosure are configured so that the tethers restraining the deployment of the side cushions 100 and the front cushions 200 are plane tethers each having a predetermined area instead of being typical string tethers. Each of the upper side and the lower side restrains the deployment of the side cushions 100 and the front cushions 200 using strong holding force of a double plane tether structure. Thus, it is possible to effectively restrain the movement of the occupant in lateral, forward, and diagonal directions, more improving the occupant protection effect. As a result, it is advantageously possible to minimize the degree of injury to the occupant in an accident.

Figure 2:
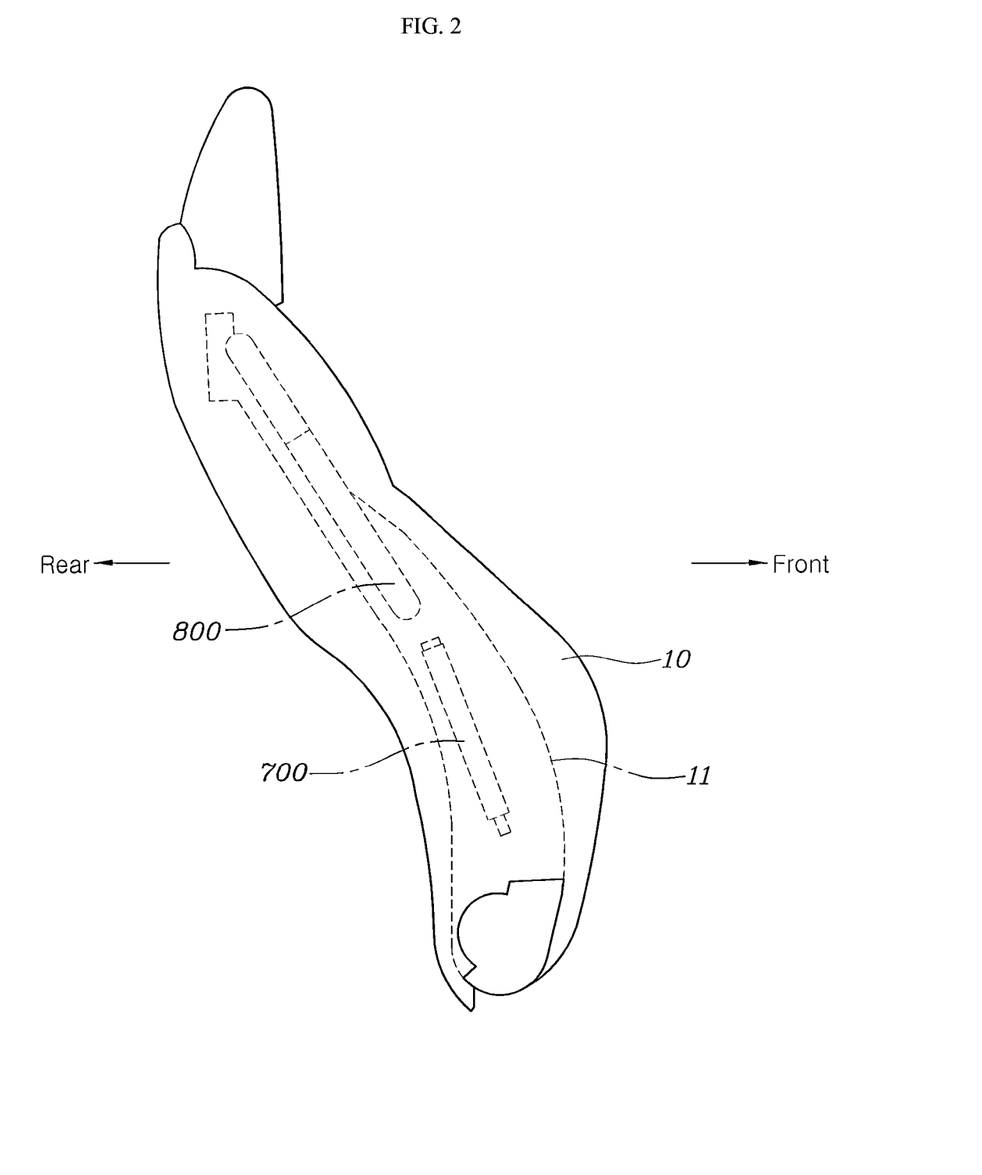
FIG. 2 is a schematic diagram illustrating the seatback with a first inflator and a second inflator being disposed therein according to an exemplary embodiment of the present disclosure.

The seat airbag device according to an exemplary embodiment of the present disclosure further includes: first inflators 700 fixed to the seatback 10 to generate airbag gas to deploy the side cushions 100, respectively, when operated; and second inflators 800 fixed to the seatback 10 to generate airbag gas to deploy the corresponding front cushions 200, respectively, when operated.

The first inflators 700 and the second inflators 800 are disposed to be fixed to a seatback frame 11 of the seatback 10, and disposed so that the second inflators 800 are positioned above the first inflators 700.

Generally, the side cushions and the front cushions are configured to be deployed together using a single inflator, so that the side cushions are deployed first and the front cushions are subsequently deployed. Thus, there has been a drawback in that the deployment time of the front cushions is delayed. Furthermore, because it is difficult for the side cushions 100 to maintain a sufficient amount of internal pressure, there has been a drawback in that the side cushions have low side collision performance.

In contrast, the seat airbag device according to an exemplary embodiment of the present disclosure has the following advantages. That is, the first inflator 700 and the second inflator 800 are provided separately, the side cushion 100 is deployed using the first inflator 700, and the front cushion 200 is deployed using the second inflator 800. Thus, it is possible to overcome the drawback in that the deployment time of the front cushion 200 is delayed. Side collision performance may be improved by maintaining a sufficient amount of internal pressure in the side cushion 100. Consequently, it is possible to more improve occupant protection performance.

Figure 5:
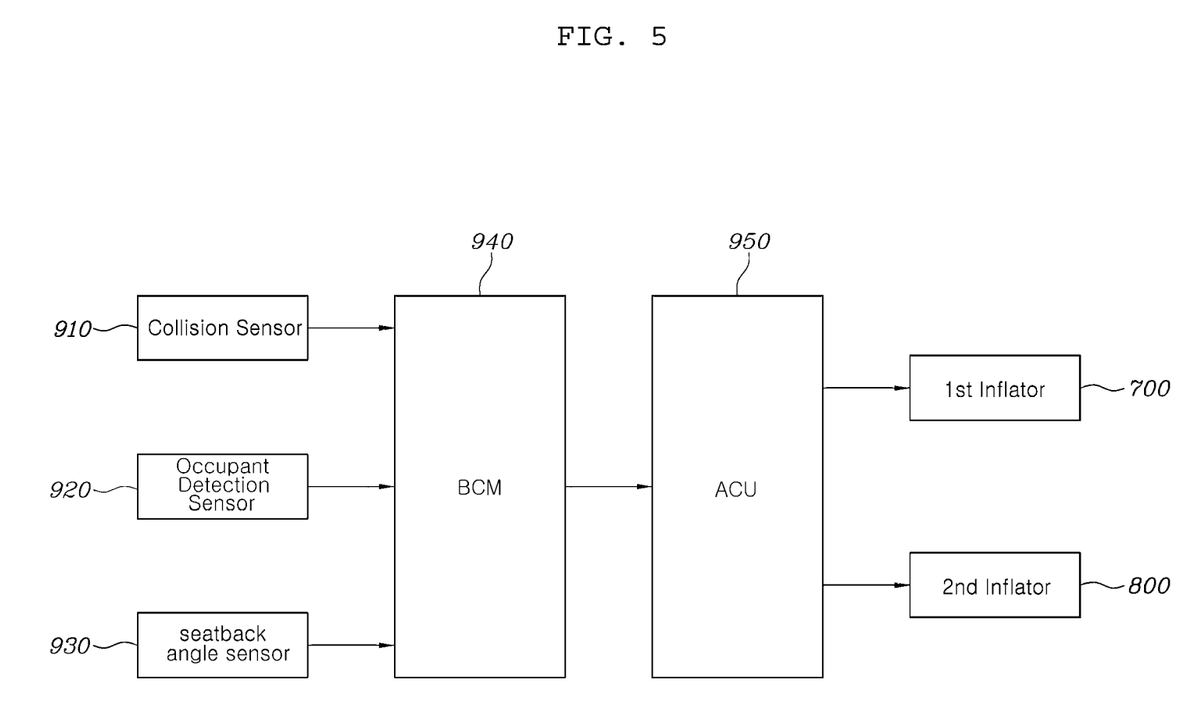
FIG. 5 and FIG. 6 are a block diagram and a flowchart illustrating a method of controlling the operation of a seat airbag device according to an exemplary embodiment of the present disclosure.

Furthermore, exemplary embodiments of the present disclosure further include an airbag control unit (ACU) 950 controlling the operation of the first inflator 700 and the second inflator 800 by receiving signals from a collision detector 910, an occupant detection detector 920, and a seatback angle detector 930 mounted on the vehicle.

The first inflator 700 and the second inflator 800 are configured to respectively operate under the control of the ACU 950.

The collision detector 910 is configured to detect an accident in advance directly before a side collision or a front collision.

The occupant detection detector 920 is a detector detecting an occupant seated on a seat provided in a vehicle. The occupant detection detector 920 may be a weight detector detecting an occupant seated on a seat based on weight or an ultrasonic detector detecting an occupant seated on a seat using ultrasonic waves.

The seatback angle detector 930 may be provided in a recliner configured for adjusting the angle of the seatback 10. The seatback angle detector 930 serves to measure an angle at which the seatback 10 is pivoted backward thereof.

Signals from the collision detector 910, the occupant detection detector 920, and the seatback angle detector 930 are transferred to the ACU 950 through a body control module (BCM) 940 of the vehicle. The ACU 950 controls the first inflator 700 and the second inflator 800 to operate to generate airbag gas necessary for deployment of the side cushion 100 and the front cushion 200.

Signals of the collision detector 910 may be transferred to the ACU 950 through the BCM 940 or directly to the ACU 950.

Regions of protection of the occupant protected by the deployed side cushion 100 include the chest, abdomen, and pelvis portions of the occupant 20. The shoulder portions may also be covered and protected as required. The regions of protection of the occupant protected by the deployed side cushion 100 may include front portions of the occupant from the shoulders to the abdomen, which may be simultaneously covered and protected.

Because the shoulder portions having relatively high strength among body portions of the occupant 20 may be covered and protected by the side cushions 100 and the front cushions 200, injury to the occupant may be minimized.

Figure 3:
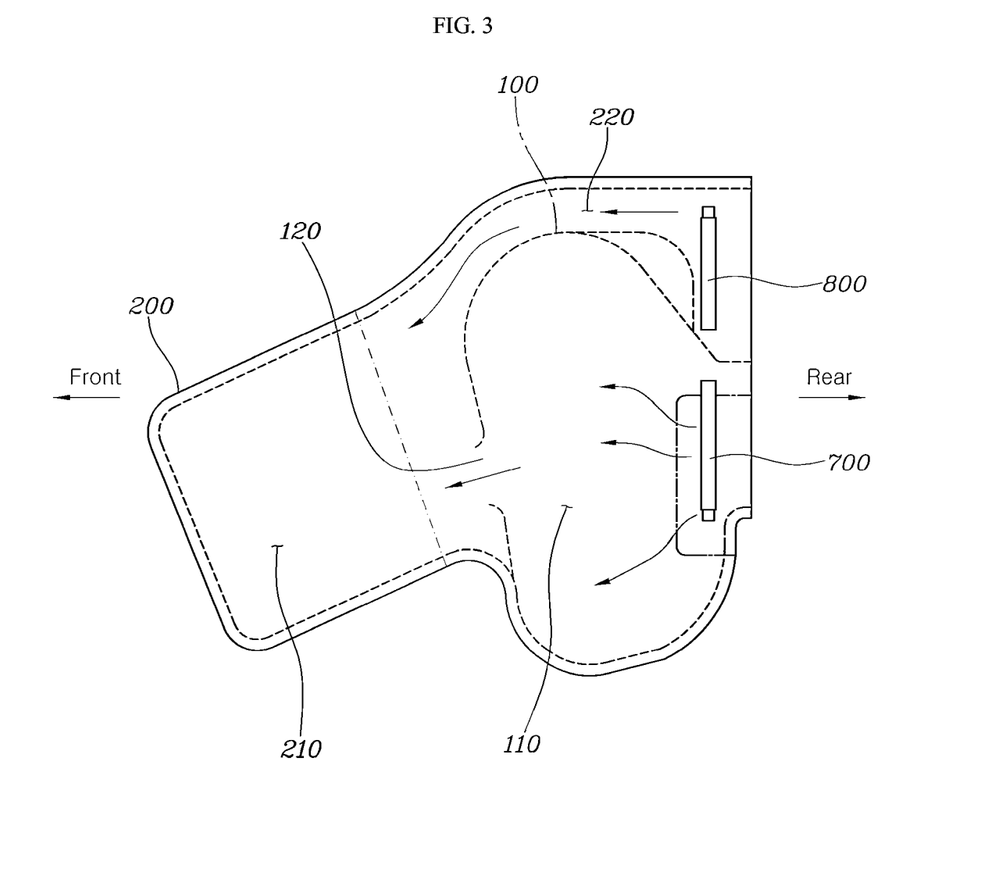
FIG. 3 is a schematic diagram illustrating a situation in which the side cushion and the front cushion are deployed according to an exemplary embodiment of the present disclosure.

In exemplary embodiments of the present disclosure, as illustrated in FIG. 3, the side cushion 100 and the front cushion 200 are configured so that deployed areas thereof are separated from each other. The first inflator 700 is disposed to be included in the deployment area 110 of the side cushion 100, and the second inflator 800 is disposed to be included in the deployment area 210 of the front cushion 200.

Furthermore, a vent hole 120 is provided in a predetermined position of the front portion of the side cushion 100, and the internal spaces of the side cushion 100 and the front cushion 200 are connected to each other through the vent hole 120.

The side cushion 100 may be deployed by the airbag gas generated by the first inflator 700. The airbag gas in the side cushion 100 may enter the front cushion 200 through the vent hole 120 to assist in deployment of the front cushion 200, speeding up the deployment time of the front cushion 200.

The deployment area 210 of the front cushion 200 includes a front cushion path portion 220 configured to be deployed above the side cushion 100. The second inflator 800 is positioned within the front cushion path portion 220.

The airbag gas generated by the second inflator 800 is transferred to the front cushion 200 through the front cushion path portion 220 to deploy the front cushion 200.

Figure 4:
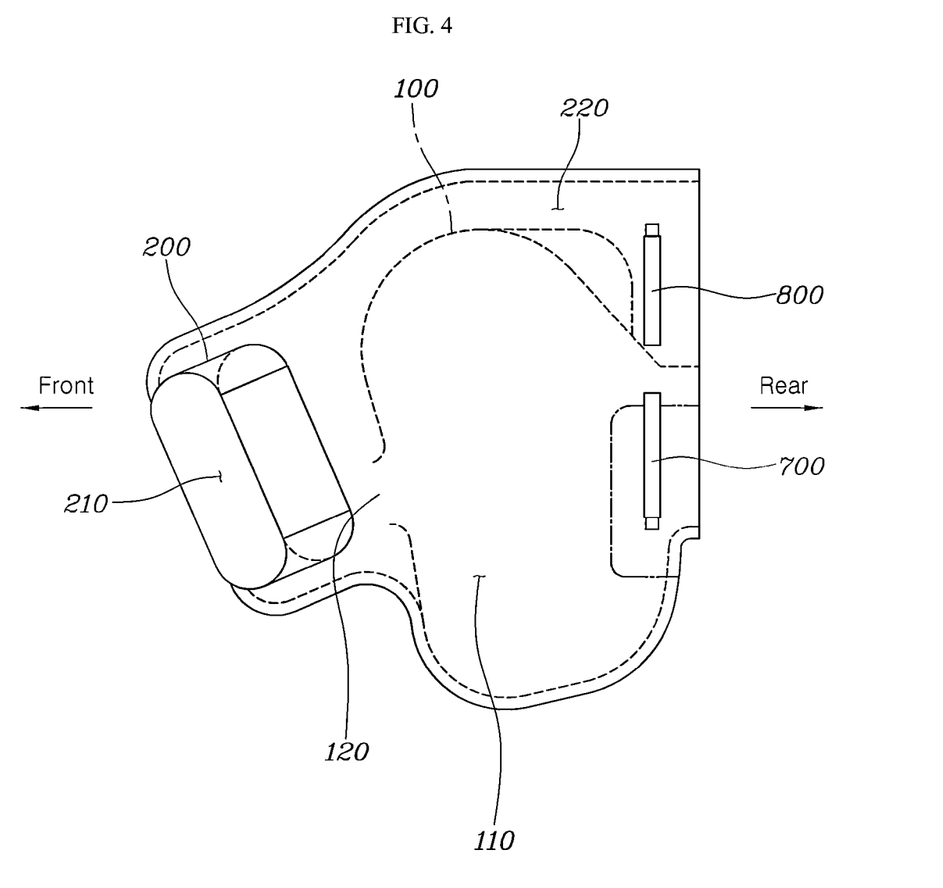
FIG. 4 is a schematic diagram illustrating a situation in which the side cushion and the front cushion fabricated separately from and sewn to the side cushion are deployed.

As illustrated in FIG. 3, the front cushion path portion 220 may be provided integrally with the front cushion 200, forming a structure in which the internal spaces of the front cushion path portion 220 and the front cushion 200 are connected to each other. Alternatively, as illustrated in FIG. 4, the front cushion path portion 220 may be fabricated separately from and sewn to the front cushion 200, forming a structure in which the internal spaces of the front cushion path portion 220 and the front cushion 200 are connected to each other.

In deployment of the front cushion 200, the front cushion path portion 220 may protect the head portion of the occupant 20 including the neck.

Figure 6:
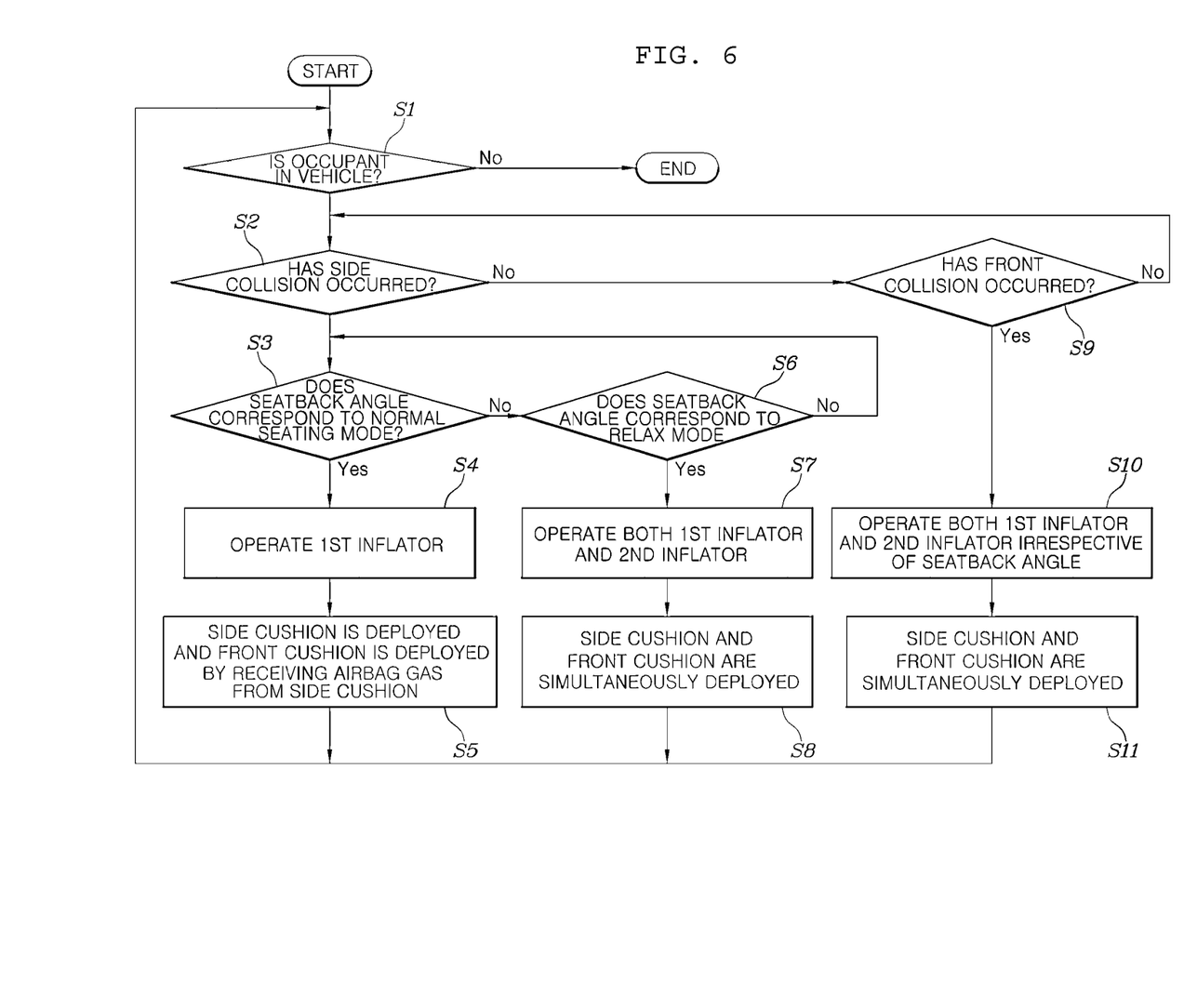

Next, a method of controlling the operation of a seat airbag device for a vehicle according to an exemplary embodiment of the present disclosure will be described with reference to FIG. 6.

When the occupant 20 enters the vehicle, the occupant detection detector 920 detects the entrance of the occupant and transfers information regarding the entrance of the occupant to the BCM 940 in step S1.

When it is determined that no occupant has entered, the logic of the present disclosure stops.

In a situation in which the occupant is in the vehicle, when a collision has occurred, the collision detector 910 detects a collision situation and transfers information regarding the collision situation to the ACU 950 through the BCM 940.

Here, the BCM 940 determines whether the collision is a side collision in step S2. When the collision is determined to be a side collision, the BCM 940 determines whether or not the angle of the seatback 10 corresponds to a normal seating mode based on a signal from the seatback angle detector 930 in step S3.

Figure 7:
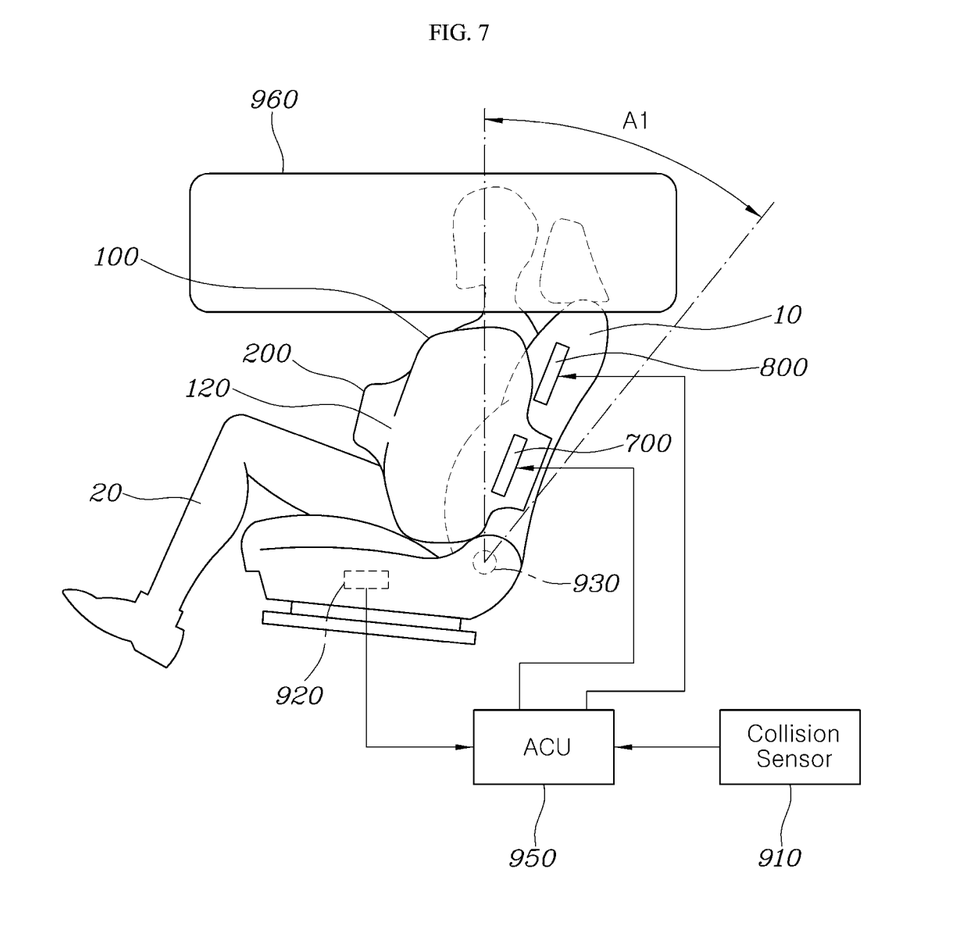
FIG. 7 is a schematic diagram illustrating a curtain airbag cushion and the side cushion being deployed when a side collision has occurred in a normal seating mode situation.

As illustrated in FIG. 7, the normal seating mode may be defined so that the angle A1 of the seatback 10 is in the range of from 90 to 150°.

When the angle of the seatback 10 is determined to correspond to the normal seating mode as a result of the determination in step S3, the first inflator 700 is operated under the control of the ACU 950 in step S4. In step S5, the side cushion 100 is deployed by airbag gas generated during the operation of the first inflator 700, and the front cushion 200 is deployed by receiving the airbag gas from the side cushion 100 through the vent hole 120 of the side cushion 100. Here, the front cushion path portion 220 of the front cushion 200 is not deployed (see FIG. 7).

That is, when the side collision has occurred, a curtain airbag cushion 960 is deployed in response to the operation of a curtain airbag device.

Thus, when the front cushion 200 is deployed together with the side cushion 100 in response to the operation of the second inflator 800 under the control of the ACU 950 in the side collision in the normal seating mode situation, an interference with the curtain airbag cushion 960 deployed by the deployment of the front cushion path portion 220 may occur, and thus, the curtain airbag cushion 960 may not be properly deployed. Consequently, occupant protection performance provided by the curtain airbag cushion 960 may be reduced.

The present disclosure is directed to improve the occupant protection performance by the curtain airbag cushion 960. When a side collision has occurred in the normal seating mode, only the first inflator 700 may operate under the control of the ACU 950 so that only the side cushion 100 is deployed. The front cushion 200 is deployed by receiving the airbag gas from the side cushion 100 through the vent hole 120 of the side cushion 100. Here, the front cushion path portion 220 of the front cushion 200 is not deployed. Consequently, it is possible to promote the curtain airbag cushion 960 to be properly deployed.

Furthermore, when the angle of the seatback 10 does not correspond to the normal seating mode as a result of the determination in step S3, whether or not the angle of the seatback 10 corresponds to a relax mode is determined in step S6. When the angle of the seatback 10 is determined to correspond to the relax mode as a result of determination in step S6, the first inflator 700 and the second inflator 800 operate simultaneously under the control of the ACU 950 in step S7. The side cushion 100 and the front cushion 200 are deployed together by receiving the airbag gas generated by the first inflator 700 and the second inflator 800 in step S8.

Figure 8:
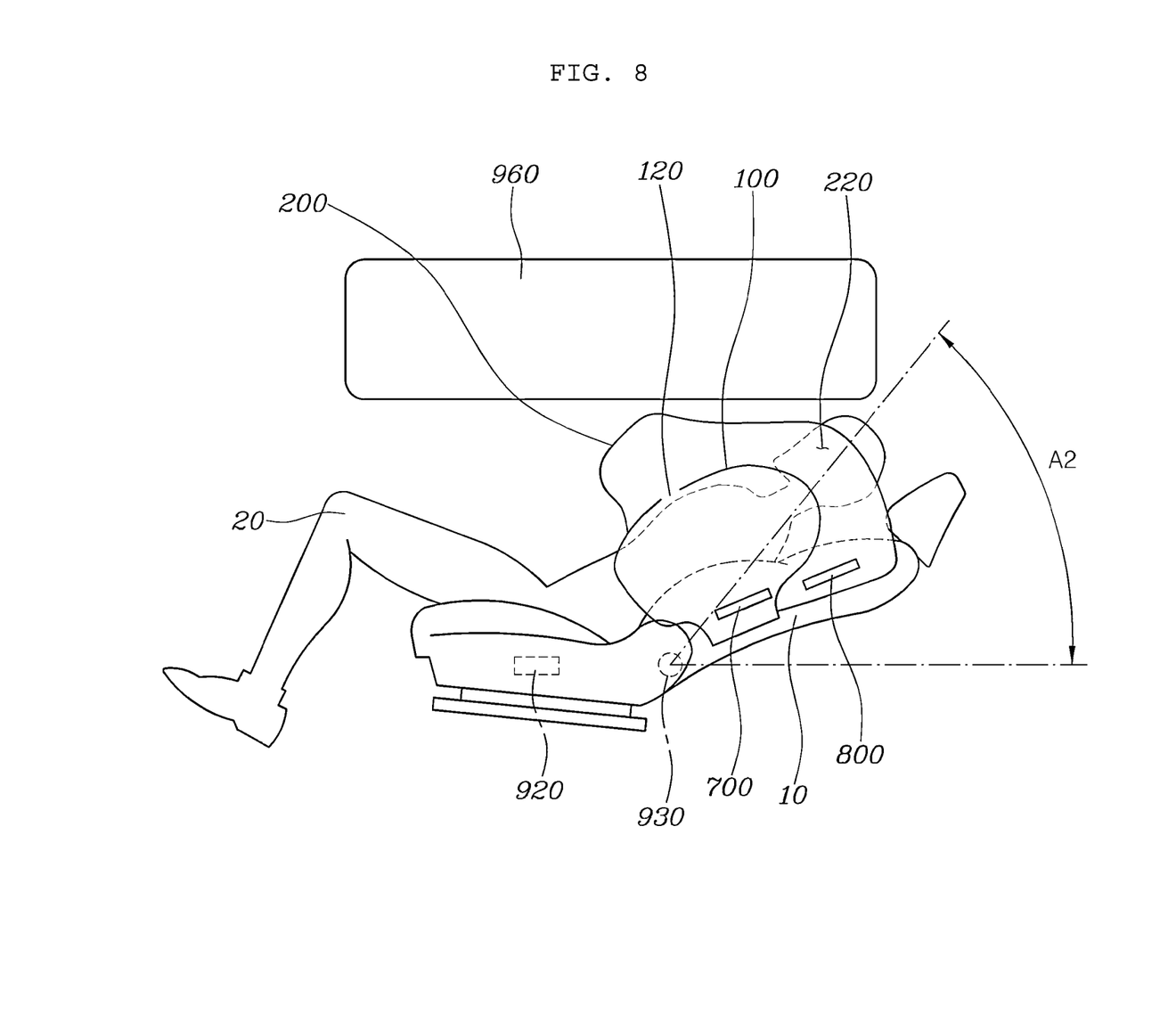
FIG. 8 is a schematic diagram illustrating the curtain airbag cushion, the side cushion, and the front cushion being deployed when a side collision has occurred in a relax mode situation.

The relax mode may be defined so that the angle A2 of the seatback 10 is in the range of from 150 to 180°, as illustrated in FIG. 8.

When a side collision has occurred in the relax mode situation as illustrated in FIG. 8, even in the case that the side cushion 100 and the front cushion 200 are deployed together in response to simultaneous operation of the first inflator 700 and the second inflator 800, the front cushion path portion 220 of the front cushion 200 being deployed does not interfere with the curtain airbag cushion 960 being deployed.

Thus, when a side collision has occurred in the relax mode situation, not only the curtain airbag cushion 960 but also both the side cushion 100 and the front cushion 200 are deployed together. Consequently, it is possible to further improve protection performance for the occupant 20 through rapid deployment of the side cushion 100 and the front cushion 200.

Furthermore, when both the side cushion 100 and the front cushion 200 are deployed in response to the side collision occurring in the relax mode situation, the airbag gas generated by the first inflator 700 is transferred to the front cushion 200 through the vent hole 120 of the side cushion 100. In the present manner, the front cushion 200 is deployed by the airbag gas generated by the second inflator 800 and the airbag gas transferred through the vent hole 120. Consequently, the deployment time of the front cushion 200 may be significantly moved forward, further improving the occupant protection performance.

Furthermore, when both the side cushion 100 and the front cushion 200 are deployed in response to the side collision occurring in the relax mode situation, a portion of the front cushion 200 is deployed to protect the head portion of the occupant 20. Consequently, it is possible to further improve the occupant protection performance.

That is, the front cushion path portion 220 deployed in the relax mode situation may be deployed to protect the head region of the occupant 20.

Figure 9:
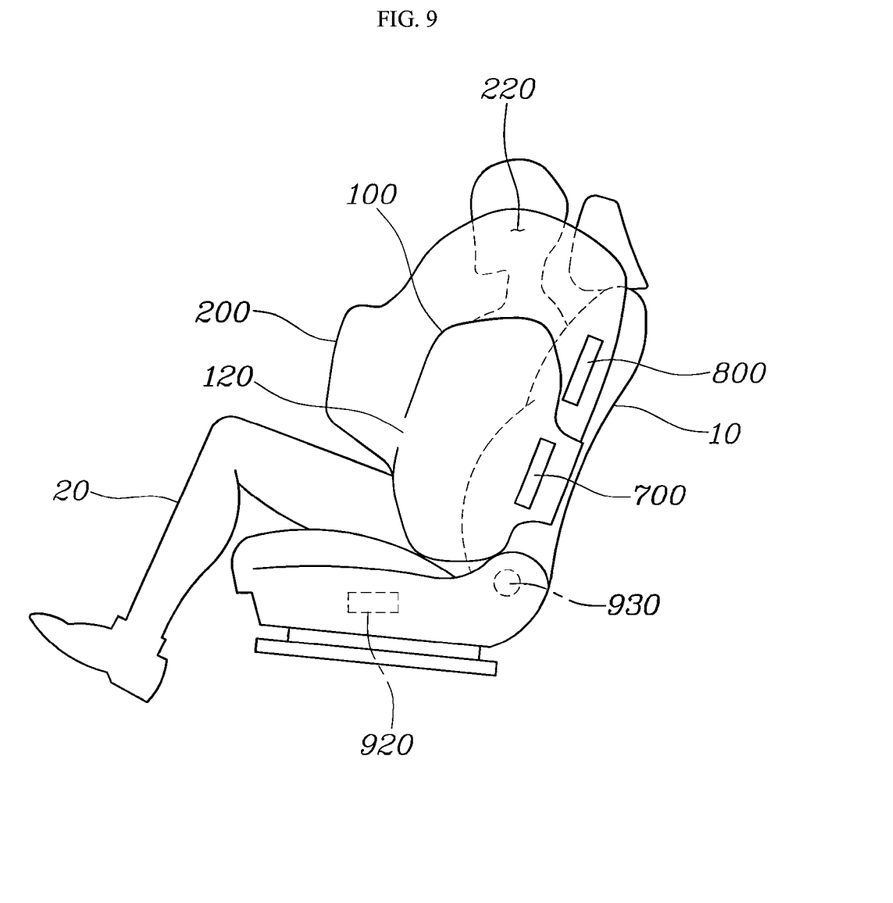
FIG. 9 is a schematic diagram illustrating the side cushion and the front cushion being deployed when a front side collision has occurred.

Furthermore, when the collision is determined to not be a side collision as a result of the determination in step S2, whether or not the collision is a front collision is performed in step S9. When the collision is determined to be a front collision as a result of the determination in step S9, both the first inflator 700 and the second inflator 800 are operated under the control of the ACU 950 irrespective of the angle of the seatback 10 in step S10, as illustrated in FIG. 9. The side cushion 100 and the front cushion 200 are deployed together by receiving the airbag gas generated by the first inflator 700 and the second inflator 800 in step S11.

Because the curtain airbag cushion 960 is not deployed in the front collision situation, both the side cushion 100 and the front cushion 200 may be deployed by operating the first inflator 700 and second inflator 800 to sufficiently protect the occupant 20.

Furthermore, when both the first inflator 700 and the second inflator 800 are operated in the front collision situation, the first inflator 700 and the second inflator 800 may simultaneously operate or sequentially operate with a predetermined time difference.

As set forth above, the seat airbag device for a vehicle according to exemplary embodiments of the present disclosure includes the side cushions 100 configured to be deployed from the seatback 10 to cover the side portions of the occupant 20 and the front cushions 200 configured to be deployed from the side cushions 100 to cover the front portion of the occupant 20. The first inflators 700 for the side cushions 100 and the second inflators 800 for the front cushions 200 are provided separately. The side cushions 100 are deployed by the first inflators 700, and the front cushions 200 are deployed by the second inflators 800. It is thus possible to overcome the drawback in that the deployment time of the front cushions 200 is delayed and improve side collision performance by maintaining sufficient amounts of internal pressure of the side cushions 100. Consequently, protection performance for the occupant may be further improved.

Furthermore, the present disclosure is configured to respectively control the deployment operation of the side cushions 100 and the deployment operation of the front cushions 200 depending on the normal seating mode and the relax mode of the occupant 20 and the side collision and the front collision of the vehicle. Consequently, the occupant may be more effectively protected.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by a plurality of control devices, or an integrated single control device.

In various exemplary embodiments of the present disclosure, the control device may be implemented in a form of hardware or software, or may be implemented in a combination of hardware and software.

Furthermore, the terms such as "unit", "module", etc. Included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described to explain certain principles of the present disclosure and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A seat airbag apparatus for a vehicle, the seat airbag apparatus comprising:
    a side cushion configured to be deployed from a seatback of the vehicle to protrude forward and be located at a side of an occupant;
    a front cushion configured to be extended from the side cushion and deployed from the side cushion to protrude in front of the occupant;
    a first inflator fixed to the seatback and configured to generate airbag gas to deploy the side cushion when the first inflator is operated; and
    a second inflator fixed to the seatback and configured to generate airbag gas to deploy the front cushion when the second inflator is operated,
    wherein the side cushion, the front cushion, the first inflator and the second inflator are provided on a lateral side of the seatback, and a second side cushion, a second front cushion, and a second pair of first and second inflators are provided on the other lateral side of the seatback.

2. The seat airbag apparatus of claim 1, further including a controller configured for controlling the operation of the first inflator and the second inflator by receiving signals from a collision detector, an occupant detection detector, and a seatback angle detector.

3. The seat airbag apparatus of claim 2, wherein the controller is configured for:
    when the occupant is in the vehicle in a collision of the vehicle, determining, by the controller whether the collision is a side collision; and when the controller concludes that the collision is the side collision, determining, by the controller, a seatback position to determine whether an angle of the seatback corresponds to a normal seating mode, wherein, depending on whether the angle of the seatback corresponds to the normal seating mode or a relax mode in which an angle of the seatback is over 150° in the determining of the seatback position, the controller is configured to selectively control the first inflator and the second inflator to operate, so that at least one of the side cushion and the front cushion is deployed by the generated airbag gas.

4. The seat airbag apparatus of claim 3, wherein, when the controller concludes that the angle of the seatback corresponds to the normal seating mode in the determining of the seatback position, the controller is configured to control the first inflator to operate, the side cushion is deployed by the airbag gas generated by the operation of the first inflator, and the front cushion is deployed by receiving the airbag gas from the side cushion.

5. The seat airbag apparatus of claim 3, wherein, when the controller concludes that the angle of the seatback corresponds to the relax mode in the determining of the seatback position, the controller is configured to control the first inflator and the second inflator to operate, and the side cushion and the front cushion are deployed together by receiving the airbag gas generated by the first inflator and the second inflator, or wherein, when the controller concludes that the collision is a front collision in the determination of the collision type, the controller is configured to control the first inflator and the second inflator to operate irrespective of the angle of the seatback, and the side cushion and the front cushion are deployed together by receiving the airbag gas generated by the first inflator and the second inflator.

6. The seat airbag apparatus of claim 1, wherein regions of protection of the occupant protected by the side cushion include a chest portion, an abdomen portion, and a pelvis portion of the occupant.

7. The seat airbag apparatus of claim 1, wherein the side cushion and the front cushion are configured so that deployment areas of the side cushion and the front cushion are separated from each other, and wherein the first inflator is disposed in the deployment area of the side cushion, and the second inflator is disposed in the deployment area of the front cushion.

8. The seat airbag apparatus of claim 7, wherein the side cushion has a vent hole provided in a predetermined position of a front portion of the side cushion, and wherein an internal space of the side cushion and an internal space of the front cushion are fluidically connected through the vent hole.

9. The seat airbag apparatus of claim 7, wherein the deployment area of the front cushion includes a front cushion path portion configured to be deployed above the side cushion, and wherein the second inflator is positioned within the front cushion path portion.

10. The seat airbag apparatus of claim 9, wherein the front cushion path portion is provided integrally with the front cushion so that an internal space of the front cushion path portion is fluidically connected to the internal space of the front cushion.

11. The seat airbag apparatus of claim 9, wherein the front cushion is fabricated separately and sewn to the front cushion path portion so that an internal space of the front cushion path portion is fluidically connected to the internal space of the front cushion.

12. The seat airbag apparatus of claim 9, wherein the front cushion path portion is configured to protect a head portion of the occupant including the neck when deployed.

13. A method of controlling operation of a seat airbag apparatus for a vehicle, the method comprising:

when an occupant is in the vehicle in a collision of the vehicle, determining, by a controller whether the collision is a side collision;

and when the controller concludes that the collision is the side collision, determining, by the controller, a seatback position to determine whether an angle of a seatback corresponds to a normal seating mode, wherein, depending on whether the angle of the seatback corresponds to the normal seating mode or a relax mode in which an angle of the seatback is over 1500 in the determining of the seatback position, the controller is configured to selectively control a first inflator and a second inflator to operate to generate airbag gas, so that at least one of a side cushion and a front cushion is deployed by the generated airbag gas, wherein, the side cushion is configured to be deployed from the seatback and the front cushion is configured to be deployed from the side cushion to protrude in front of the occupant, the first inflator is configured to generate airbag gas to deploy the side cushion, the second inflator is configured to generate airbag gas to deploy the front cushion, and wherein the side cushion, the front cushion, the first inflator and the second inflator are provided on a lateral side of the seatback, and a second side cushion, a second front cushion, and a second pair of first and second inflators are provided on the other lateral side of the seatback.

14. The method of claim 13, wherein, when the controller concludes that the angle of the seatback corresponds to the normal seating mode in the determining of the seatback position, the controller is configured to control the first inflator to operate, the side cushion is deployed by the airbag gas generated by the operation of the first inflator, and the front cushion is deployed by receiving the airbag gas from the side cushion.

15. The method of claim 13, wherein, when the controller concludes that the angle of the seatback corresponds to the relax mode in the determining of the seatback position, the controller is configured to control the first inflator and the second inflator to operate, and the side cushion and the front cushion are deployed together by receiving the airbag gas generated by the first inflator and the second inflator.

16. The method of claim 15, wherein, when the side cushion and the front cushion are deployed together in the relax mode, a portion of the front cushion is deployed to protect a head portion of the occupant.

17. The method of claim 15, wherein, when the side cushion and the front cushion are deployed together in the relax mode, the airbag gas generated by the first inflator is transferred to the front cushion through a vent hole of the side cushion to speed up a deployment time of the front cushion.

18. The method of claim 13, wherein, when the controller concludes that the collision is a front collision in the determination of the collision type, the controller is configured to control the first inflator and the second inflator to operate irrespective of the angle of the seatback, and the side cushion and the front cushion are deployed together by receiving the airbag gas generated by the first inflator and the second inflator.

19. The method of claim 13, wherein, when the first inflator and the second inflator operate in a front collision, the first inflator and the second inflator simultaneously operate or sequentially operate with a predetermined time difference.

20. A non-transitory computer readable storage medium on which a program for performing the method of claim 13 is recorded.

* * * * *